Oct. 11, 1949.   L. R. HOUGHTALING   2,484,033
BRAKE MECHANISM FOR ROTARY FILES
Filed March 5, 1948                           2 Sheets-Sheet 1

INVENTOR.
Lester R. Houghtaling
BY
Cushman & Co. by Cushman
Attorneys

Oct. 11, 1949.    L. R. HOUGHTALING    2,484,033
BRAKE MECHANISM FOR ROTARY FILES
Filed March 5, 1948    2 Sheets-Sheet 2
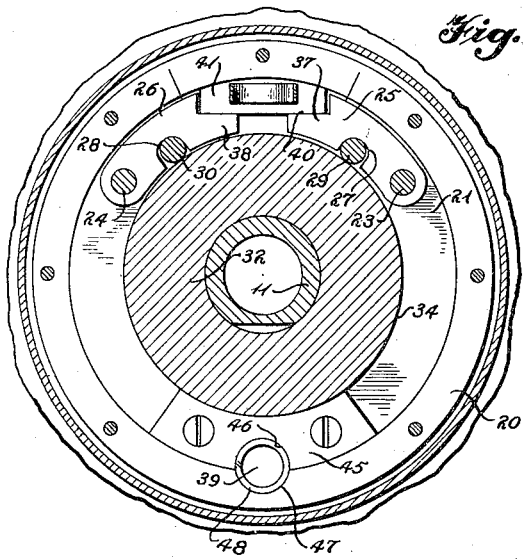
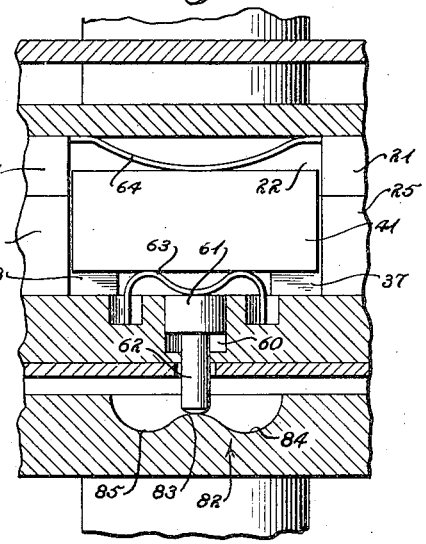
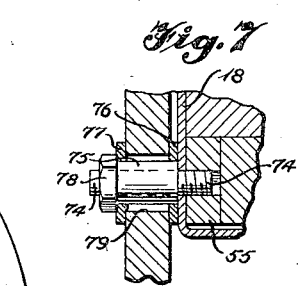
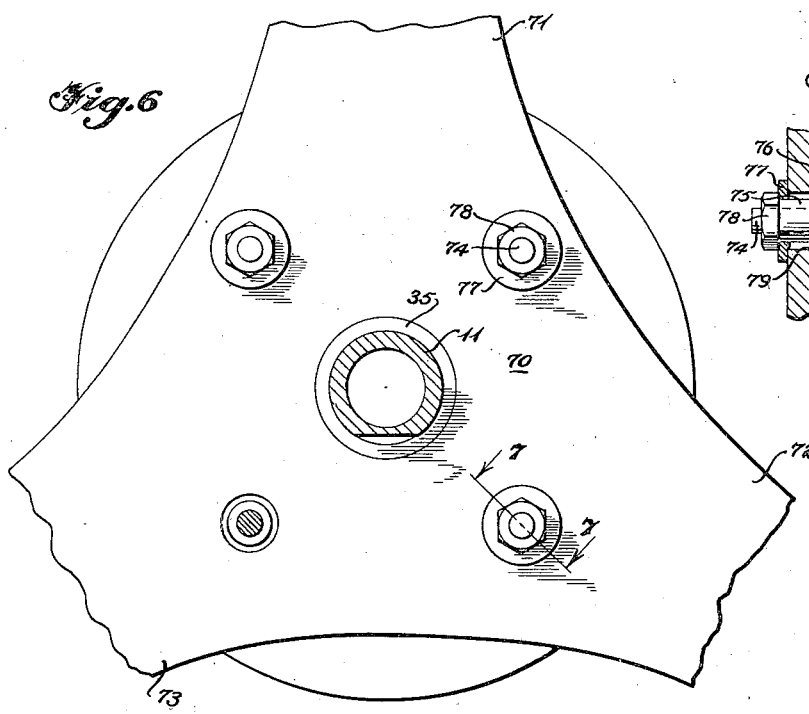
INVENTOR.
Lester R. Houghtaling
BY
Attorneys Patented Oct. 11, 1949

2,484,033

UNITED STATES PATENT OFFICE 2,484,033

BRAKE MECHANISM FOR ROTARY FILES

Lester R. Houghtaling, Yonkers, N. Y., assignor to Wheeldex Manufacturing Co., Inc., New York, N. Y., a corporation of New York Application March 5, 1948, Serial No. 13,203

9 Claims. (Cl. 192—8)

The present invention relates to new and improved brake mechanisms and controlling devices therefor, for use with rotary filing drums and the like. The invention constitutes modifications of and improvements upon apparatus of the kind shown, described and claimed in the prior application of Richard P. Scholfield, filed November 21, 1947, Serial No. 787,409.

The present invention relates particularly to a modified and simplified form of brake mechanism and to improvements in the means for controlling the mechanism. As pointed out in the former application, it is of great advantage in the rotary file art, to provide, in association with the filing drum, a brake mechanism which will prevent rotation of the drum in either direction, when certain operations are being performed, such as searching for and locating a particular file card, removing or replacing cards from the drum, or posting entries on the cards. It is equally important, however, that the rotation of the drum in either direction may be readily effected, when desired.

It has been found to be efficient to interpose, between a filing drum and a stationary part, such as the stationary axle upon which the drum is journalled, an automatically operated brake mechanism which will lock the drum against rotation at all times, except when the operator desires to rotate the drum. In accordance with the invention of the above application, a handle mechanism is associated with the drum and means are provided for automatically releasing the brake mechanism when deliberate turning forces are imparted to the handle, so that the drum may be rotated by moving the handle. When the handle is released, the brake mechanism automatically is rendered operative to prevent inadvertent rotation of the drum.

The present invention relates to the same class of devices, and the primary object is to provide an improved and simplified brake mechanism.

A further object of the invention is to provide improved brake controlling means and improved means for actuating the latter through movement imparted to the drum-turning handle mechanism.

Another object of the invention is to provide limited lost motion between the handle of the drum and to utilize the lost motion for releasing the brake mechanism prior to the application of turning force from the handle to the drum.

Another object is to provide means for returning the handle mechanism to the mid-point of lost motion, when released, and to provide means for automatically rendering the brake mechanism operative when the handle so returns to the mid-point.

Other and further objects and advantages of the invention will be apparent from a consideration of the following description of an illustrative embodiment, shown in the accompanying drawings, in which, Figure 1 is an elevation and partial section, showing the brake housing of the present invention and a fragmentary central portion of one head of the filing drum;

Figure 4 is a similar view on line 4—4 of Figure 2;

Figure 5 is an enlarged horizontal section on line 5—5 of Figures 2 and 4, showing the brake actuating wedge and the cam and cam follower connection between the handle mechanism and the brake mechanism;

Figure 6 is a fragmentary elevation and partial section showing the central portion of the handle mechanism, looking from the left of Figure 2, and Figure 7 is a sectional detail taken on line 7—7 of Figure 6.

Figure 1:
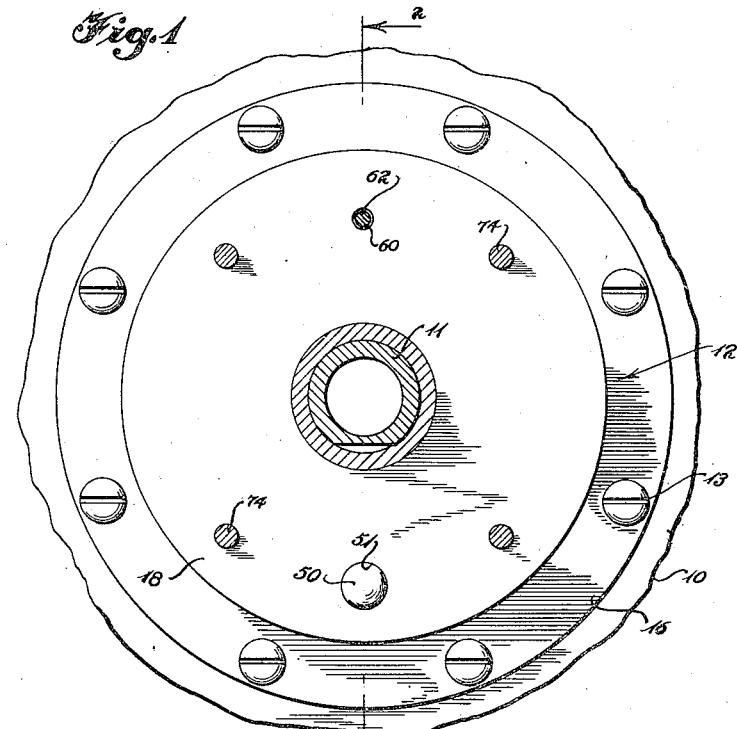

Reference is made to the above identified application for a disclosure of the type of filing drum with which the brake and control mechanism of the present invention is adapted for use. Also, such filing equipment is shown in the prior patent to Scholfield et al., No. 2,046,655.

A filing drum having an end face or head, a fragmentary portion of which is indicated at 10, may be journalled for rotation upon a stationary axle or shaft 11 by suitable bearings, not shown, as is well understood in the art. A brake housing 12 may be secured to the drum head 10, in coaxial relation, by screws or rivets 13, with a spacer ring 14 and an inner closure plate 15 interposed. The housing includes an outwardly projecting, attaching flange 16, a cylindrical wall 17, and an inwardly projecting annular outer face portion 18. The housing may be made of suitable sheet metal, stamped or spun to shape.

Secured to the inner plate 15 is an axially projecting, annular member 20 having a radially inwardly projecting flange 21 extending substantially completely around the inner circumference thereof but interrupted for a short distance, at the top in Figure 4, to provide an open space as indicated at 22 in Figure 5. The flange 21 carries a pair of axially projecting pins 23, 24, upon which are pivoted a pair of brake shoes 25 and 26, having recesses 27, 28 in their inner surfaces, for the reception of rollers 29, 30. The bottoms of the recesses are inclined in opposite directions from a maximum depth toward the free ends of the shoes to a minimum depth toward the pivoted ends of the shoes.

The stationary shaft 11 carries a brake drum or hub 32, restrained against rotation by a key 33. The hub has a cylindrical circumference 34 constituting a braking surface for engagement with the rollers 29 and 30, and at its forward end is provided with an axially projecting sleeve portion 35, having an outer surface concentric with the shaft 11.

Figure 2:
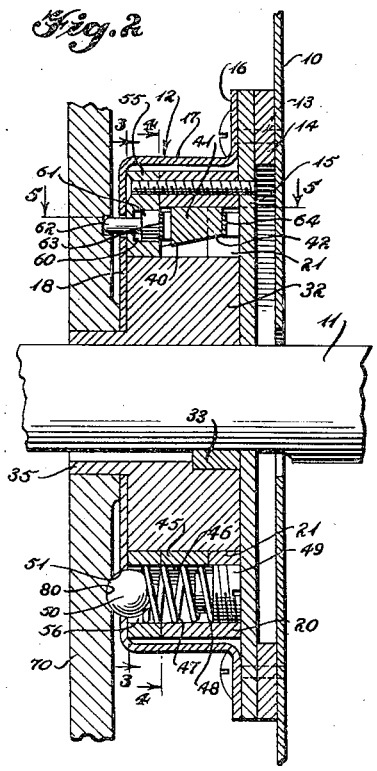
Figure 2 is a vertical section on line 2—2 of Figure 1.
Figure 3:
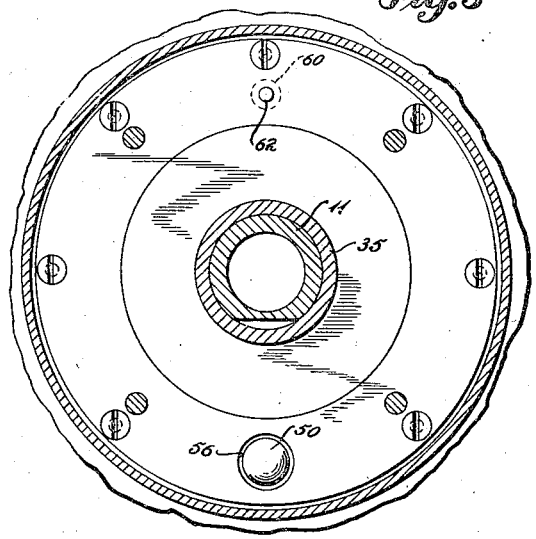
Figure 3 is a section and elevation on line 3—3 of Figure 2.

The shoes 25 and 26 have stepped ends 37, 38, the upper surfaces of which are inclined downwardly and forwardly as indicated at 40 in Figure 2. A wedge member 41 having a complemental inclined lower surface 42 is mounted upon the inclined surfaces of the shoes and is guided by the stepped portions thereof and by the end faces of the flange 21, for limited axial movement.

The flange 21 at a portion thereof opposite to the brake shoes carries an arcuate block 45, having an axial groove 46 therein, mating with a groove 47 formed in ring 20, to provide a cylindrical socket for a compression spring 48, seated upon a guide screw 39 and urging a ball 50 outwardly, so that the latter partially projects through an opening 51 in the front face 18 of housing 12.

An outer ring 55 interposed between the inner ring 20 and the housing face 18 is bored as at 56, to provide a continuation of the socket for spring 48 and ball 50. Also, at a substantially diametric point, the ring 55 is socketed at 60, to receive a plunger 61 having a shank portion 62 extending through holes of reduced size in the outer face of the ring 55 and the casing wall 18. The plunger, through the interposition of a leaf spring 63, engages the outer face of the wedge 41 and the latter is backed up by another leaf spring 64, tending constantly to urge the wedge outwardly or to the left in Figure 2.

A handle mechanism 70, which may include three radially projecting arms 71, 72, and 73, spaced on angles of 120°, is mounted for rotation on the hub extension 35, for limited lost motion with respect to the drum and brake mechanism and is connected to the housing by a plurality of studs 74, threaded into the outer ring 55, projecting through the housing plate 18 and having sleeves 75 thereon, interposed between washers 76 and 77 and clamped in place by nuts 78. The studs and sleeves are loosely received in enlarged openings 79 in the handle 70, to the end that the handle may have limited lost motion in both directions relative to the studs and sleeves.

The spring pressed ball 50 is seated in a socket 80 formed in the inner face of the handle, so that the handle always tends to return to a particular position, with the studs 74 centering in the enlarged openings 79, i. e., at the mid-point of lost motion of the handle relative to the drum.

At a point diametrically opposed to the socket 80, the inner face of the handle mechanism is shaped to provide, or carries, a cam 82, having a central rise 83 and terminal valley portions 84 and 85. The shank 62 of the stud 61 is disposed in cam following relation to the cam 82, and, when the handle is at the mid-point of lost motion, as determined by ball 50 in socket 80, the rise 83 is in engagement with the cam follower, the latter is forced axially inwardly or to the right, the wedge 41 is shifted in the same direction and the ends of the brake shoes 25 and 26 are forced radially inwardly, moving the rollers 29 and 30 into jamming relation to the surface 34 of the brake drum 32.

The operation is as follows:

With the parts in this normal position, rotation of the filing drum in both directions is restrained by the rollers 29 and 30 interposed between the brake shoes and the brake drum. Hence, with the handle released and its position determined by the ball 50 in socket 80, the brake mechanism is effective, and cards may be removed or applied, and entries posted, without rotation being imparted to the drum. When deliberate turning force is imparted to the handle mechanism in either direction, however, the ball 50 moves at least partially out of the socket 80 and the handle mechanism moves to its limit of lost motion, as determined by the connection between the studs 74 and collars 75 disposed in the enlarged openings 79. This relative movement between the handle and the brake mechanism brings one or the other of the valleys 84 or 85 of cam 82 opposite the cam follower 62, which permits the spring 64 to force the wedge 41 toward the left in Figure 2, whereby the ends of the brake shoes are released, permitting the shoes to rise somewhat and the rollers 29 and 30 to ride freely around the surface 34 of the brake drum 32, without any jamming or braking action. Hence, the filing drum may be freely rotated in either direction by manipulation of the handle mechanism. As soon as the handle is released, however, the spring pressed ball 50 enters the socket 80 and returns the handle to the original position at the mid-point of its lost motion. The central raised portion 83 of the cam again forces the cam follower axially inwardly, driving the wedge onto the inclined surfaces at the ends of the brake shoes and forcing them radially inwardly so that the rollers 29 and 30 are again disposed in jamming relation to the brake drum. In this position, the filing drum is again locked against inadvertent rotation.

The invention is not limited to the details of construction shown in the accompanying drawings and described above, but includes all modifications coming within the scope of the appended claims and their equivalents.

I claim:

1. In combination, a stationary shaft, a member journalled for rotation thereon, a handle journalled co-axially of the shaft and connected to the member with limited lost motion for rotating the same, a brake mechanism for normally restraining rotation of the member, and means for releasing the brake mechanism upon the application of rotational force to the handle, said mechanism comprising a pair of oppositely operating one-way brakes, shiftable between operative and inoperative positions, a wedge for normally shifting them to the operative position, means urging the wedge to release position, a connection between the handle and wedge resisting the last mentioned means when the handle is in normal, released position, but permitting such shifting of the wedge when the handle is moved through said lost motion relative to the member.

2. In combination, a stationary shaft, a member journalled for rotation thereon, a handle journalled co-axially of the shaft and connected to the member with limited lost motion for rotating the same, a brake mechanism for normally restraining rotation of the member and means for releasing the brake mechanism upon the application of rotational force to the handle, said mechanism comprising a pair of oppositely acting one-way brakes shiftable between operative and inoperative positions, an axially movable wedge for shifting the brakes to the operative position, said brake releasing means comprising normally ineffective means for urging the wedge to a brake releasing position and a connection between the wedge and handle rendering the last mentioned means effective upon movement of the handle relative to the member through said lost motion, whereby the brakes are released and the member may be rotated upon rotation of the handle.

3. In combination, a stationary shaft, a member journalled for rotation thereon, a handle journalled co-axially of the shaft and connected to the member with limited lost motion for rotating the same, a brake mechanism for normally restraining rotation of the member, and means for releasing the brake mechanism upon the application of rotational force to the handle, said mechanism comprising a stationary cylindrical brake surface, a pair of oppositely acting one-way brakes rotatable with the drum and shiftable between operative and inoperative positions relative to said surface, a movable wedge for controlling the positions of the brakes, resilient means for moving the wedge to release the brakes, and a connection between the handle and the wedge normally preventing such movement of the wedge, said brake releasing means comprising means associated with said handle for rendering the connection ineffective upon the rotation of the handle relative to the member through said lost motion.

4. In combination, a stationary shaft, a member journalled for rotation thereon, a handle journalled co-axially of the shaft, and connected to the member with limited lost motion for rotating the same, a brake mechanism for normally restraining rotation of the member, and means for releasing the brake mechanism upon the application of rotational force to the handle, said mechanism comprising a brake drum fast on the shaft having an exterior brake surface, a pair of oppositely acting one-way brakes rotatable with the member and pivoted for swinging movement toward and from the drum surface between operative and inoperative positions, a wedge shiftable axially of the member from a release position to a position forcing the brakes to their operative position, resilient means for moving the wedge to its release position, a connnection between the wedge and the handle resisting the force of said resilient means and normally holding the wedge in the operative position, said means for releasing the brake mechanism comprising means for rendering the last mentioned connection ineffective upon the shifting of the handle relative to the member through said lost motion connection.

5. In combination, a stationary shaft, a member journalled for rotation thereon, a handle journalled co-axially of the shaft, connected to the member with limited lost motion for rotating the member, means normally maintaining the handle at substantially the mid-point in said lost motion when released, a brake mechanism and brake controlling means, said mechanism comprising braking means mounted for movement between operative and inoperative positions, and said brake controlling means comprising a cam follower movable in one direction for shifting the brake mechanism to the operative position, spring means urging the cam follower in the opposite direction and a cam carried by the handle, the cam being shaped to shift the follower to the first position when the handle is at said mid-point and to release the follower when moved through said lost motion in either direction.

6. In combination, a stationary shaft, a member journalled thereon, a brake element fast on the shaft, a pair of shoes pivotally connected to the member for rotation therewith and for movement between operative and release positions and having oppositely inclined recesses therein, rollers in the recesses adapted to jam against the stationary brake elements when the shoes are in operative position, a handle for rotating the member, mounted for limited lost motion with respect thereto, spring means for urging the handle to the mid-point of lost motion, means actuated by the handle when at said mid-point for shifting the shoes to operative position, and means for shifting the shoes to the inoperative position when the handle is moved in either direction to the limit of its lost motion.

7. In combination, a stationary shaft, a member journalled thereon, a brake hub fast on the shaft, a pair of brake shoes pivotally connected to the member for swinging movement between an inner operative position and an outer release position, said shoes having oppositely inclined recesses therein, rollers in the recesses adapted to jam against the hub when the shoes are in the former position, a handle for rotating the member mounted for limited lost motion with respect thereto, a connection between the member and the handle urging the latter to the mid-point of lost motion, a cam and cam follower connection between the handle and the shoes for maintaining the shoes in their inner, operative positions when the handle is at said mid-point and means for shifting the cam follower to inoperative position upon movement of the handle and cam from said mid-point position, whereby the shoes move to inoperative position.

8. A combination in accordance with claim 7 in which the shoes are urged inwardly by an axially movable wedge and in which the cam follower forces the wedge into operative position by force transmitted thereto from the cam on the handle, the cam having a rise engaging the follower when the handle is at said mid-point.

9. The combination in accordance with claim 7 characterized in that the shoes are urged inwardly by an axially movable wedge, that the cam is associated with the handle and has a central rise and terminal valleys, and that the follower is interposed between the wedge and cam and is engageable with the rise when the handle is at said mid-point and movable into either valley to release the wedge upon movement of the handle to either limit of its lost motion.

LESTER R. HOUGHTALING.

No references cited.